United States Patent
Holt et al.

[11] Patent Number: 6,070,192
[45] Date of Patent: May 30, 2000

[54] CONTROL IN A DATA ACCESS TRANSPORT SERVICE

[75] Inventors: Robert Hugh Holt, Nepean; Robert Thomas Gibson, Ottawa; Robert Myers, Mississauga, all of Canada

[73] Assignee: Nortel Networks Corporation, Montreal, Canada

[21] Appl. No.: 08/997,799

[22] Filed: Dec. 24, 1997

[30] Foreign Application Priority Data

May 30, 1997 [CA] Canada .................................. 2206616

[51] Int. Cl.[7] .............................. G06F 15/16; G06F 15/00
[52] U.S. Cl. ........................ 709/227; 709/200; 709/224; 709/229
[58] Field of Search ................................. 709/227, 229, 709/224, 220, 200; 713/202

[56] References Cited

U.S. PATENT DOCUMENTS

| | | | |
|---|---|---|---|
| 5,623,601 | 4/1997 | Vu ........................................... | 713/202 |
| 5,724,521 | 3/1998 | Dedrick . | |
| 5,752,238 | 5/1998 | Dedrick . | |
| 5,768,521 | 6/1998 | Dedrick .................................. | 709/224 |
| 5,771,349 | 6/1998 | Picazo, Jr. et al. . | |
| 5,822,518 | 10/1998 | Ooki et al. . | |
| 5,842,125 | 11/1998 | Modzelesky et al. . | |
| 5,862,324 | 1/1999 | Collins .................................... | 709/220 |

*Primary Examiner*—Zarni Maung
*Assistant Examiner*—Almari Romero
*Attorney, Agent, or Firm*—C. W. Junkin

[57] ABSTRACT

In a Data Access Transport Service (DATS), Data Service Providers (DSPs) share dial-in access (e.g. analog modem or Integrated Services Digital Network (ISDN) access) resources from a common pool maintained by a Local Exchange Carrier (LEC) (or potentially a DSP. A system is disclosed wherein a Network Controller (NC) performs the role of DSP service partitioning, quota enforcement, and resource load balancing to ensure that a DATS provider can provide a high quality of service (availability, response time & consistent bandwidth) to subscribed DSPs and their end-users. The Network Controller assists in Internet Data call establishment and tear-down, with the ability to refuse calls when the associated DSP has exceeded its service quota. The Network Controller also assists in the routing of calls to one of the DSPs Network Gateways (or data routers), using a load balancing scheme that maintains a pre-defined relative load on given DSP Network Gateways. The Network Controller will also provide an implementation that supports Multilink Point-to-Point Protocol (MLP) and 56 kbps data calls for ISDN BRI access. Additionally, the Network Controller will perform such functions as statistics collection, and network element administrative control. The Network Controller can be positioned to provide similar service control functionality with higher speed access technologies such as Asymmetric Digital Subscriber Loop (ADSL) and high-speed cable modems.

33 Claims, 4 Drawing Sheets

CONTROL IN A DATA ACCESS TRANSPORT SERVICE

FIELD OF THE INVENTION

The present invention relates generally to data communications network access and, more particularly, to Internet Protocol based services, dial-in data network access, data network transport, Virtual Private Dial-in Networks, and ISDN BRI and PRI data connections.

BACKGROUND OF THE INVENTION

Current data dial-in services permit end-users to connect their Personal Computers (PCs) and routers to a Data Service Provider (DSP). The DSP provides end-users with access to the Global Internet, and, in the case of Corporate DSPs, access to corporate intranets.

Traditionally, connectivity between end-user PCs and a DSP is achieved through the use of a PC modem, which sends packetized data by modulating an analog signal. The modem uses the Public Switched Telephone Network (PSTN) to achieve connectivity to a corresponding DSP-owned modem in a modem pool, which de-modulates the signal and routes the packetized data to the appropriate destination, based on the control information embedded in the data packet. Alternatively, connectivity may be achieved via ISDN BRI or PRI access facilities. End-user authentication, authorization, and accounting is performed by the ISP via standard techniques such as clear text password authentication, Password Authentication Protocol (PAP), or Challenge Handshake Authentication Protocol (CHAP). Once an end-user has been authenticated as a valid user, the end-user's data packets are sent to the appropriate destination (depending on the data packet's destination address), allowing the end-user to use data networking applications such as telnet, electronic mail, File Transfer Protocol (FIP), and Hyper-Text Markup Language (HTML) applications.

This arrangement has led to some problems. Network studies have shown that a typical end-user dial-in data session lasts for twenty minutes, and that some sessions remain active for hours or days. These long duration data calls can cause congestion of the PSTN, which is engineered for voice calls which are typically three to five minutes in duration. PSTN congestion results in added cost to LECs in regrading voice switches, and provisioning additional inter-office facilities (IOF) to handle the added load between voice switches.

From the DSP perspective, dial-in data services have created a different set of problems. The cost of maintaining modem pools contributes a large percentage of a DSPs operating costs. Additionally, increasing modem pool capacity requires new access lines (either single access lines or multiplexed facilities such as Primary Rate Interface ISDN or channelized T1), which require significant lead-time for the LEC to install, making it difficult for a DSP to react quickly to increasing market needs in a timely fashion.

As a solution to these problems, Local Exchange Carriers (LECs) and some Large DSPs have begun to investigate alternative connectivity options allowing end-users to access the internet or corporate intranet. These service providers create a Data Access Transport Service (DATS) through which DSPs, who subscribe to the DATS, outsource their ISDN Basic Rate Interface (BRI) and analog modem pools to an LEC or DSP (hereinafter, for simplicity, referred to as "the LEC"), who maintain a large modem pool to be shared by all subscribed DSPs. Thus, a DATS allows the DSPs to operate a Virtual Private Dial-in Network (VPDN), where calls and virtual resources to the said DSP remain private and confidential, even though the physical facilities are shared among multiple DSPs.

DATS calls, which can be recognized from the dialed number by the originating switch, can be immediately diverted to the DATS equipment via direct trunking facilities, thus removing long duration data calls from inter-office facilities, tandem and egress switches. Additionally, LECs can also implement front-end devices that recognize end-user data calls and divert the calls to DATS equipment via direct trunking facilities, thus removing such calls from the originating switch as well, effectively removing PSTN congestion due to long duration data calls.

DATS tariffs can be based on the number of logical modem ports subscribed to (which defines the maximum number of simultaneous end-users who can access that particular DSP via DATS), and the Wide Area Network (WAN) link(s) that provide connectivity between the DSP data equipment and the DATS data equipment (which defines the maximum instantaneous aggregate bandwidth available to all end-users connected to that particular DSP via DATS). End-user AAA (Authentication, Authorization, and Accounting) can be performed by the LEC on behalf of the DSP, or alternatively, the LEC can perform only partial authentication and forward on the information to the DSP via tunneling protocols such as Layer 2 Forwarding (L2F), Point-to-Point Tunneling Protocol (PPTP), or Layer 2 Tunnelling Protocol (L2TP).

The DATS does effectively remove the PSTN congestion issue, and can provide DSPs a more cost-effective arrangement than managing their own modem pool (the subscribed DSP benefits from the economy of scale provided by the LEC's DATS large modem pool). However, some issues arise with this implementation. First, the LEC providing the DATS must ensure that it can guarantee to its subscribed DSPs a pre-defined quality of service. That is, the LEC needs to guarantee that a particular DSP will have access to the number of logical ports it has subscribed to (with an agreed blocking ratio). To meet this requirement, the LEC must be able to enforce a given DSPs service quota so that, during periods of high demand, a DSP will not use more resources, or ports, than it has subscribed to, which results in lost revenue to the LEC, and may negatively impact other DSPs' service quality. This is a challenging requirement, since it involves a real-time view of all simultaneous users connected to each DSP, and the ability to refuse connectivity to a particular DSP (should a connection request exceed that DSP's service quota).

Another issue with DATS relates to the distribution of calls over multiple DSP Network Gateways (NGs). If tunneling protocols are used, a DSP may interface with the DATS via more than one Network Gateway, which terminates the tunneling protocol. In such cases, it is important that the DATS system maintain an even call distribution among the Network Gateways, such that each end-user who is connected to the DSP is provided with the same quality of service (bandwidth, delay, etc.) as other connected end-users. Additionally, a DSP may install Network Gateways of different processing power, such that it becomes important that the DATS system distribute the calls based on the processing power and bandwidth handling capability of each Network Gateway. This is a challenging requirement, since it involves a real-time view of all simultaneous users connected to each DSP's Network Gateway, and the ability to direct new data calls to specific Network Gateways, taking into account the Network Gateway's processing power and bandwidth handling capability.

An important service offering for ISDN BRI end-users is the ability to support Multilink Point-to-Point Protocol (MLP), which binds the two B-channels of an ISDN BRI connection together, giving the end-user 128 kbps of effective throughput. In order for the MLP to function, however, all associated MLP segments (known as a MLP bundle) must be sent to the same Network Gateway when a tunnelling protocol is used. However, the PSTN may route different segments of a MLP bundle to diverse DATS facilities, to different pieces of equipment that route calls to Network Gateways independently. While this is an inherent characteristic of a DATS system that improves reliability, it also makes MLP coordination a challenge. Also, some ISDN terminal adaptors can send data in a 56 kbps format (as opposed to the traditional 64 kbps format), as some LECs charge higher rates for 64 kbps ISDN calls. This can cause problems, however, as DATS equipment receiving the call would interpret the call (based on the ISDN signalling message) as an analog call, and route the call to an analog modem, which would cause the call to fail. A DATS system needs an implementation that can indicate that an incoming ISDN call is of the 56 kbps data format, so that it can treat the call appropriately.

Finally, while a DSP which subscribes to a DATS does not need to physically manage a modem pool, it loses access to vital operations information it needs for activities such as customer service, marketing, troubleshooting, forecasting, and engineering. Also, some DSPs may require some real-time service tuning (for example, changing the DSP's number of ports available). A DATS must be able to provision DSP service attributes in real-time, provide real-time access to service information for troubleshooting purposes, as well as provide a repository of past system performance, for DATS performance analysis. Since the DATS may be quite large (on the order of tens of thousands of ports), it is important for LEC operations efficiency that this information be kept in a central, easily accessed location. Also, it is sometimes necessary for the LEC and/or DSP to alter the administrative state of a DATS network element, i.e. to disallow new calls from being routed through certain network elements (for example, if software is to be upgraded), while at the same time allowing existing calls already assigned to the said device to remain unaffected (such calls would be removed when the end-user terminates the call). This poses a challenge for the LEC, as today's DATS implementations involve the distributed installation of multiple modem termination units (a modem termination unit is also known as a Network Access Server (NAS), which can typically support up to 100 multiple end-user data sessions).

Traditionally, centralized control and monitoring of data equipment is implemented using network management applications that employ standard management protocols such as Simple Network Management Protocol (SNMP). The management applications, however, were not designed for real-time service control applications, where the response time must be sufficiently low so as not to exceed either PSTN voice call timers, or end-user call response expectations.

SUMMARY OF THE INVENTION

It is an object of the present invention to provide a new and improved data access transport service.

One aspect of the invention provides a data access transport system comprising a plurality of network access servers and a network controller connected to the network access servers. Each network access server is operable: to send a connection setup request to the network controller on receipt of a data call before answering the data call, the connection setup request specifying a data service provider to which a connection is requested; to receive a connection setup response from the network controller, the connection setup response indicating whether the requested connection is to be completed; to respond to a connection setup response indicating that the connection is to be completed by answering the data call and initiating a connection to the specified data service provider; and to respond to a connection setup response indicating that the connection is not to be completed by initiating a busy indication. The network controller is operable: to receive a connection setup request from any of the network access servers; to determine whether a quantity of network resources currently used by the data service provider specified in the connection setup request is less than an service quota assigned to the data service provider; and to send a connection setup response to the network access server which sent the connection setup request, the connection setup response indicating that the requested connection is to be completed when the quantity of network resources currently used by the data service provider is less than the assigned service quota and the connection setup response indicating the requested connection is not to be completed when the quantity of network resources currently used by the data service provider is not less than the assigned service quota.

Another aspect of the invention provides a network controller for use in a data access transport system comprising a plurality of network access servers connected to the network controller. The network controller comprises: means for receiving a connection setup request from any of the network access servers; means for determining whether a quantity of network resources currently used by the data service provider specified in the connection setup request is less than a service quota assigned to the data service provider; and means for sending a connection setup response to the network access server which sent the connection setup request, the connection setup response indicating that the requested connection is to be completed when the quantity of network resources currently used by the data service provider is less than the assigned service quota and the connection setup response indicating the requested connection is not to be completed when the quantity of network resources currently used by the data service provider is not less than the assigned service quota.

These aspects of the invention enable the network controller to enforce service quotas for each of the data service providers served by the data access transport service so that network access servers of the data access transport service can be shared to realize economies of scale.

The network controller may further comprise: means for maintaining a count of active calls to each data service provider served by the data access transport system; means for maintaining a count of active calls served by each network gateway served by the data access transport system; and means for selecting a network gateway for completing a connection to a data service provider based on the counts of active calls served by each network gateway connected to the data service provider; the means for sending a connection setup response being responsive to the means for selecting a network gateway to send a connection setup response specifying the selected network gateway.

These features enable the network controller to distribute data calls across multiple network gateways so that each end user receives approximately the same level of service.

The network controller may comprise means for maintaining a record of tunnels currently connected between network access servers and network gateways. The means for selecting a network gateway may be operable to select a network gateway based on the counts of active calls served by each network gateway and the record of tunnels currently connected between network access servers and network gateways.

These features enable the network controller to select a network gateway so as to use an existing tunnel instead of a less busy network gateway to which no tunnel is currently established. This can reduce tunneling protocol overhead.

The network controller may comprise means for recognizing call setup requests corresponding to segments of a MLP call. The means for selecting a network gateway for completing a connection to a data service provider may be responsive to the means for recognizing call setup requests corresponding to segments of a MLP call to select the same network gateway for all segments of a MLP call.

These features enable the network controller to ensure that MLP calls are properly handled by the data access transport service.

The network controller may comprise means for recognizing call setup requests corresponding to data calls requiring 56 kbps service. The means for sending a connection setup response may be responsive to the means for recognizing call setup requests corresponding to data calls requiring 56 kbps service to send a connection setup response indicating that 56 kbps service is required.

These features enable the network controller to ensure that 56 kbps calls are properly handled by the data access transport service.

The network controller may comprise: means for deriving operational data from at least one of connection setup requests, connection setup responses, connection release requests, connection release acknowledgements and error conditions detected by the network controller; and means for recording at least some of the derived operational data.

These features enable the network controller to collect in real time operational data needed by the data service providers and the data access transport service providers to manage their services effectively without the need for costly polling of network components.

The network controller may comprise means for flagging network gateways as disabled. The means for selecting a network gateway may respond to the means for flagging network gateways as disabled by not selecting any network gateway currently flagged as disabled.

The network controller may also comprise means for flagging groups of directory numbers as disabled, each directory number group comprising at least one directory number. The means for sending a connection setup response may respond to the means for flagging directory number groups as disabled to send connection setup responses indicating that connections are not to be completed in response to connection setup requests specifying directory numbers in directory number groups which are flagged as disabled.

The network controller may also comprise means for flagging network access servers as disabled. The means for sending a connection setup response may respond to the means for flagging network access servers as disabled to send connection setup responses indicating that connections are not to be completed in response to connection setup requests sent by network access servers which are flagged as disabled.

These features enable the administrators of the data access transport service to assign and enforce administrative states on individual network components.

Another aspect of the invention provides a network access server for use in a data access transport system comprising a network controller connected to the network access server. The network access server comprises: means for sending a connection setup request to the network controller on receipt of a data call before answering the data call, the connection setup request specifying a data service provider to which a connection is requested; means for receiving a connection setup response from the network controller, the connection setup response indicating whether the requested connection is to be completed; means for answering the data call and initiating a connection to the specified data service provider in response to a connection setup response indicating that the connection is to be completed; and means for initiating a busy indication in response to a connection setup response indicating that the connection is not to be completed.

The network access server may further comprise means responsive to a signal indicating that the network access server is disabled to send a signal to an access network indicating that access channels of the network access server are unavailable for use.

The network access server may also comprise means responsive to a signal indicating that the network access server is re-enabled to send a signal to an access network indicating that access channels of the network access server are available for use.

Yet another aspect of the invention provides a method for operating a data access transport system comprising a plurality of network access servers and a network controller connected to the network access servers. The method comprises: sending a connection setup request from a network access server to the network controller on receipt of a data call before answering the data call, the connection setup request specifying a data service provider to which a connection is requested; determining at the network controller whether a quantity of network resources currently used by the data service provider specified in the connection setup request is less than a service quota assigned to the data service provider; sending a connection setup response from the network controller to the network access server which sent the connection setup request, the connection setup response indicating that the requested connection is to be completed when the quantity of network resources currently used by the data service provider is less than the assigned service quota and the connection setup response indicating the requested connection is not to be completed when the quantity of network resources currently used by the data service provider is not less than the assigned service quota; responding at the network access server to a connection setup response indicating that the connection is to be completed by answering the data call and initiating a connection to the specified data service provider; and responding at the network access server to a connection setup response indicating that the connection is not to be completed by initiating a busy indication.

Still another aspect of the invention provides a method for operating a network controller for use in a data access transport system comprising a plurality of network access servers connected to the network controller. The method comprises: receiving a connection setup request from any of the network access servers; determining whether the quantity of network resources currently used by the data service provider specified in the connection setup request has a current number of active calls less than a service quota assigned to the data service provider; and sending a connection setup response to the network access server which sent the connection setup request, the connection setup response indicating that the requested connection is to be completed when the quantity of network resources currently used by the data service provider is less than the assigned service quota and the connection setup response indicating the requested connection is not to be completed when the quantity of network resources currently used by the data service provider is not less than the assigned service quota.

Another aspect of the invention provides a method for operating a network access server in a data access transport system comprising a network controller connected to the network access server. The method comprises: sending a connection setup request to the network controller on receipt of a data call before answering the data call, the connection setup request specifying a data service provider to which a connection is requested; receiving a connection setup response from the network controller, the connection setup response indicating whether the requested connection is to be completed; answering the data call and initiating a connection to the specified data service provider in response to a connection setup response indicating that the connection is to be completed; and initiating a busy indication in response to a connection setup response indicating that the connection is not to be completed.

An embodiment of the invention provides a system whereby analog modem and/or ISDN BRI data calls to a DATS are processed in real time in order to enforce service quotas, process requirements based on data call service type, balance calls across DSP terminating devices, support MLP and 56 kbps features for ISDN, and provide access to real-time network status information. The invention also provides the ability to invoke administrative states on specific network elements involved in a Data Access Transport Service (DATS), wherein the control is applied centrally.

The embodiment provides a method for centralized real-time control of a distributed DATS system. The method includes steps for determining the number of active call resources assigned to a DSP and for limiting the number of simultaneous call resources (assigned to a particular DSP) to a pre-configured value, where call resources may be the number of call sessions, the bandwidth utilized by each call, the aggregate bandwidth used by the call sessions, etc. The method also includes steps to distribute calls to a DSP's multiple Network Gateways so that a predetermined relative load on each Network Gateway is maintained, and so that all segments of a MLP bundle are routed to a common Network Gateway. The method also allows for the distinguishing between analog modem calls and ISDN data calls, and between ISDN 64 kbps and 56 kbps data call formats. The method also provides a repository of centrally stored service configuration data, as well as historical call and event logs and operational measurements. Additionally, the method provides a method by which a central directory of information may be maintained against DSPS, and against individual DATS system components, allowing this information to be transmitted to individual DATS system elements (such as the NAS, the Network Gateway, Management Systems, etc.). Finally, the method provides the ability to perform DATS system element auditing, to ensure that DATS elements are operating as expected.

In operation of the embodiment, a telephone switching system routes an analog modem or ISDN BRI call to a Network Access Server (NAS) of a DATS system. This routing is performed based on the dialed number, which the telephone system recognizes as a DATS number. In addition to routing the call to the NAS, the telephone system also provides the NAS with the dialed number, as well as the calling party's number (via standard telephony signalling techniques such as Primary Rate Interface (PRI) signalling or Common Channel Signalling number 7). Upon completion of the routing of the call at the NAS, the NAS then sends a connection setup request to a Network Controller (NC)), including information such as the dialed number, call type (analog modem or ISDN data), and a unique call identifier. This indication is transmitted via a logical signalling path between the NAS and the NC. The NC matches the dialed number against stored DSP information, and, based on the information, determines if the call should be completed (based on the number of active calls to the DSP). The NC then signals the NAS with an indication that either authorizes or refuses the call. The decision to accept or refuse the call is based on the available resources in the DATS network, both physical and logical (for example, the number of active calls to the associated DSP, or bandwidth available on affected links, or processing/call handling capacity remaining on individual components) and the validity of the requested resources (for example, the dialed number). If the call is authorized, the Network Gateway to which the data call will be routed is indicated to the NAS (based on Network Gateway load balancing and MLP handling algorithms), along with additional service-related information (such as an indication that a call originally detected by the NAS as an analog modem call is actually a 56 kbps ISDN data call), and an active call count for the DSP is incremented. The NAS then completes the call to the indicated Network Gateway using appropriate end-user AAA, control, and communication protocols. Upon termination of the data call (either by end-user or DSP action), the NAS signals to the NC that the call has been terminated, including information such as the termination cause, send and receive data rates, and tunnel protocol information (if a tunnel protocol was used in completing the call). This information is stored at the NC for later analysis or troubleshooting purposes. Additionally, the NC can also terminate a call if required, in which case an indication is sent to the NAS instructing it to release the call.

In one example, an LEC may implement a DATS system in order to relieve Public Switched Telephone System (PSTN) congestion, as well as provide value-added transport services to DSPs. In such a scenario, the LEC would install a number of NASs with connectivity to the PSTN, creating a large modem pool, which is shared by DSPs which subscribe to the DATS. Note that while described as a modem pool, the installation of NASs may also support ISDN data calls, or other data access protocols such as ADSL. Each NAS has connectivity to each DSP via logical data network connections such as those provided via X.25, Frame Relay or ATM. Each DSP subscribing to the DATS requests a number of logical modem or ISDN data ports, as well as the bandwidth of the network connection into the DATS system. Note that the number of ports determines the total number of simultaneous calls (or ISDN B-channels in the case of ISDN data calls) to the DSP via the DATS. In its efforts to ensure that each DSP will have available to it the resources subscribed to, the LEC will install a NC, thus allowing the LEC to limit calls to a particular DSP. Analog modem and ISDN data call limits (or service quotas) can be enforced separately, or can be combined. Additionally, if the DSP requires multiple Network Gateways, the LEC can also distribute calls across the multiple Network Gateways, and can ensure that individual segments of a MLP bundle are routed to a common Network Gateway. The LEC would access the historical logs and operational measurements stored on the NC in order to forecast DATS growth, identify potential points of congestion, troubleshoot network failures, or trace the cause of customer complaints.

BRIEF DESCRIPTION OF THE DRAWINGS

Embodiments of the invention are described below with reference to accompanying drawings in which.

DETAILED DESCRIPTION

Figure 1:
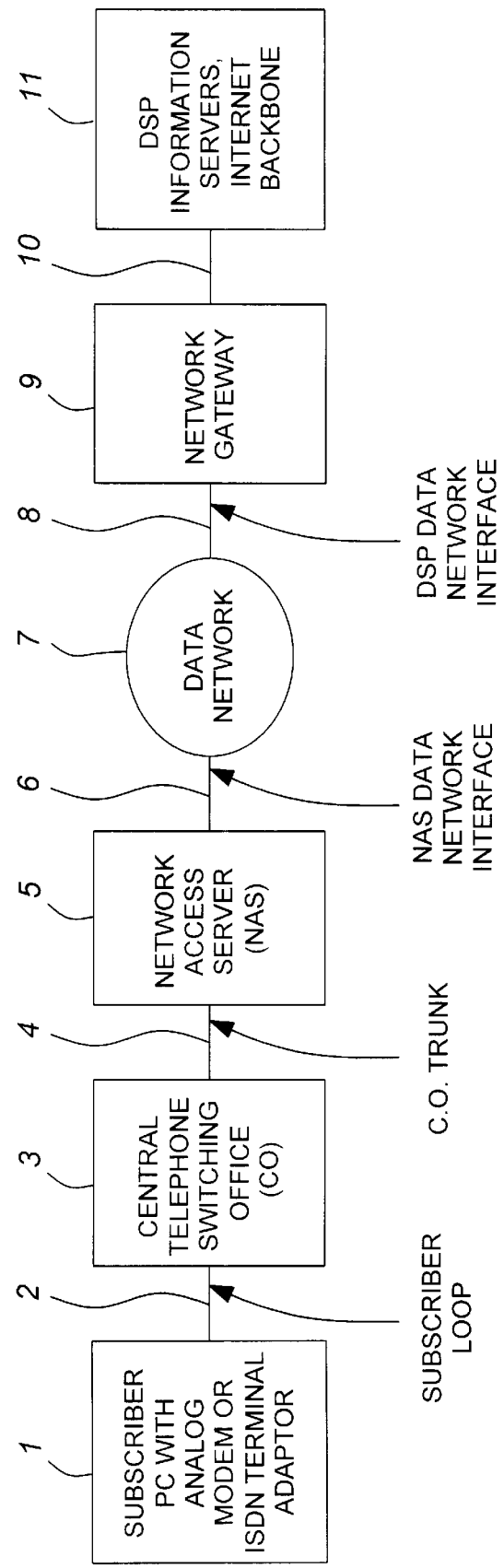
FIG. 1 is a schematic representation of a previously proposed DATS system.

Referring to FIG. 1, an end-user's personal computer (PC) outfitted with either a modem or an ISDN Terminal Adaptor (TA) 1 is connected via the subscriber loop 2 to a central telephone switching office (CO) 3. The CO 3 is connected directly, or indirectly (via tandem switching systems) to a Network Access Server (NAS) 5 via a CO trunk 4. The NAS 5 contains the Digital Signal Processing circuitry (not shown) required for the support of analog modem calls, as well as the HDLC and signalling processor (also not shown) required for ISDN data call support. The NAS 5 also supports end-user authentication schemes such as PAP, CHAP, and RADIUS; link-layer protocol processing such as Serial Link Interface Protocol (SLIP), Point-to-point protocol (PPP); tunnelling protocol such as Layer 2 Forwarding (L2F), Layer 2 tunnelling protocol (L2TP); and, data networking protocols such as Transport Control Protocol (TCP), User Datagram Protocol (UDP), Internet Protocol (IP); as well as link-layer protocols such as Ethernet, Frame Relay, X.25, or Asynchronous Transfer Mode (ATM). The NAS 5 connects to the DSP's Network Gateway 9 via a data network 7. The NAS 5 connects to the data network 7 via a NAS Data Network Interface 6, using protocols such as Ethernet, Token Ring, Fiber Distributed Data Interface (FDDI), Frame Relay, or ATM. The Network Gateway 9 connects to the data network 7 via the DSP Data Network Interface 8, using protocols such as Ethernet, Token Ring, Fiber Distributed Data Interface (FDDI), Frame Relay, or ATM. The data network 7 provides the necessary protocol interworking (not shown) in order to achieve compatibility between interfaces 6 and 8. The Network Gateway 9 provides the tunnelling protocol termination on the DSP side. The Network Gateway 9 is connected to other DSP devices and resources 11 such as information servers, or an internet backbone gateway, which provides connectivity to the public Internet Backbone.

Figure 2:
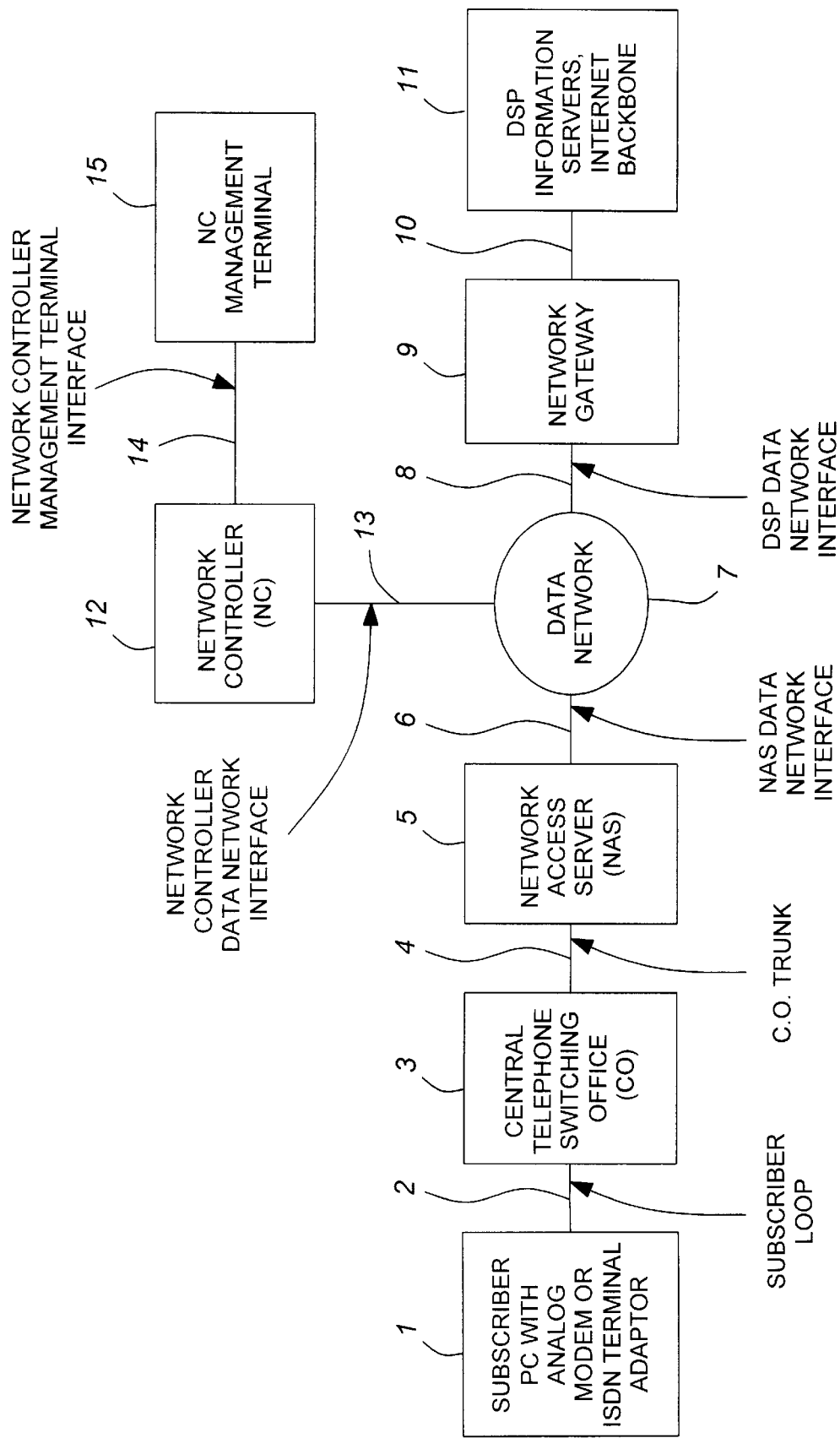
FIG. 2 is a schematic representation of a DATS system including a NC, in accordance with an embodiment of the present invention.

Referring to FIG. 2, reference numerals 1 to 11 refer to the same corresponding elements as were described above with reference to FIG. 1. FIG. 2 also includes a Network Controller (NC) 12, and a NC Management Terminal 14. The NC 12 is connected to the NAS 5 via the data network 7. The NC 12 is connected to the data network 7 via the Network Controller Data Network Interface 13, using protocols such as Ethernet, Token Ring, Fiber Distributed Data Interface (FDDI), Frame Relay, or ATM. The data network 7 provides the necessary protocol interworking (not shown) in order to achieve compatibility between interfaces 6 and 8, and between interfaces 6 and 13.

The NAS 5 and the NC 12 support the signalling protocol required to exchange data call control information. LEC operations personnel may configure NC service via a NC Management Terminal 15, which is connected to the NC 12 via a NC Management Terminal Interface 14. The NC Management Terminal 15 can be either an ASCII terminal capable of sending command-line interface commands to the NC 12, or, alternatively, can also be a workstation running SNMP-based management applications. The NC Management Terminal Interface 14 can be either a direct connection, such as RS-232, or can utilize Local Area Network (LAN) and Wide Area Network (WAN) technologies such as Ethernet, Frame Relay, or Asynchronous Transfer Mode, allowing the NC Management Terminal to be located remotely from the NC.

Figure 3A:
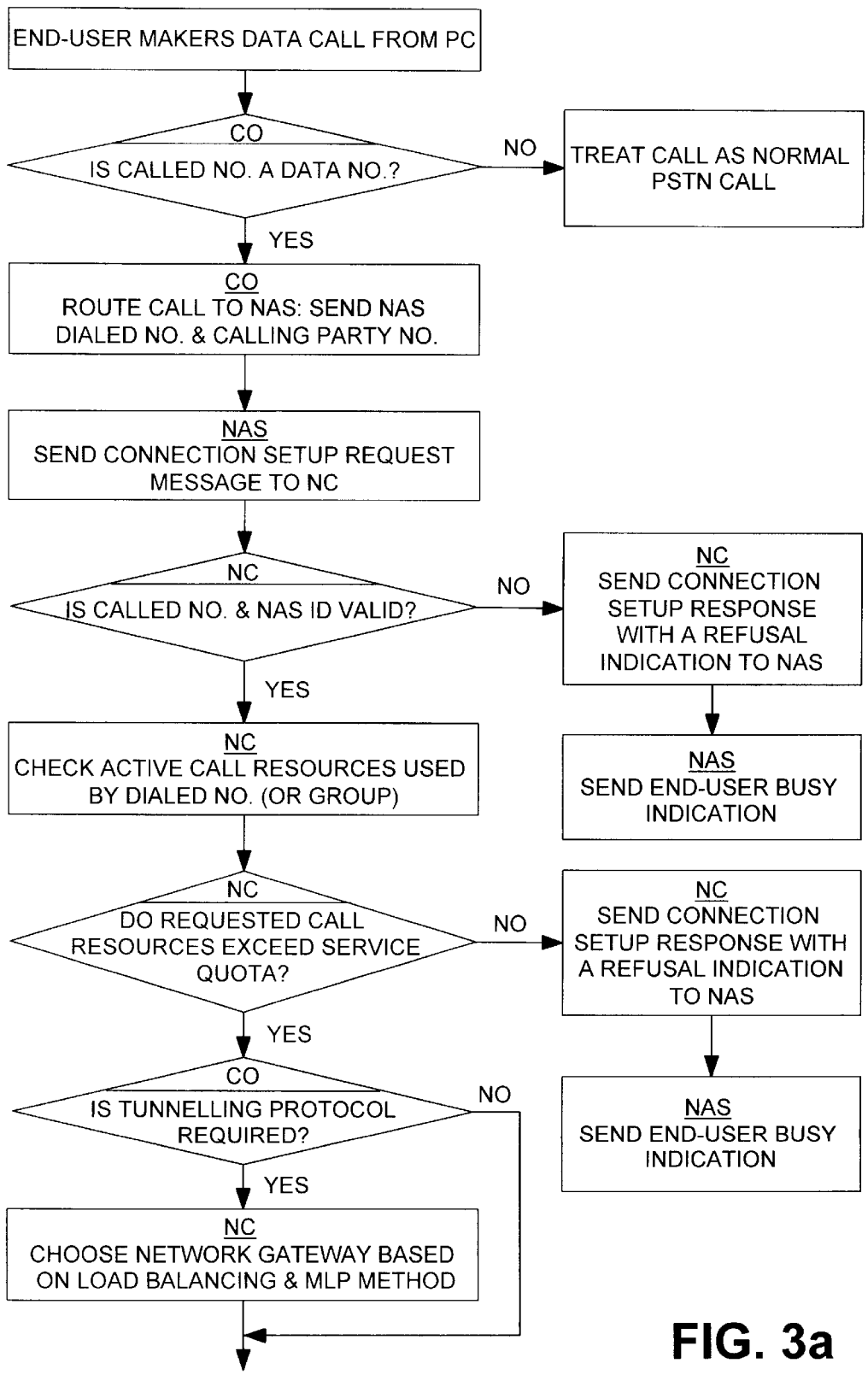
FIGS. 3a and 3b are flow charts illustrating operation of the DATS system of FIG. 2.
Figure 3B:
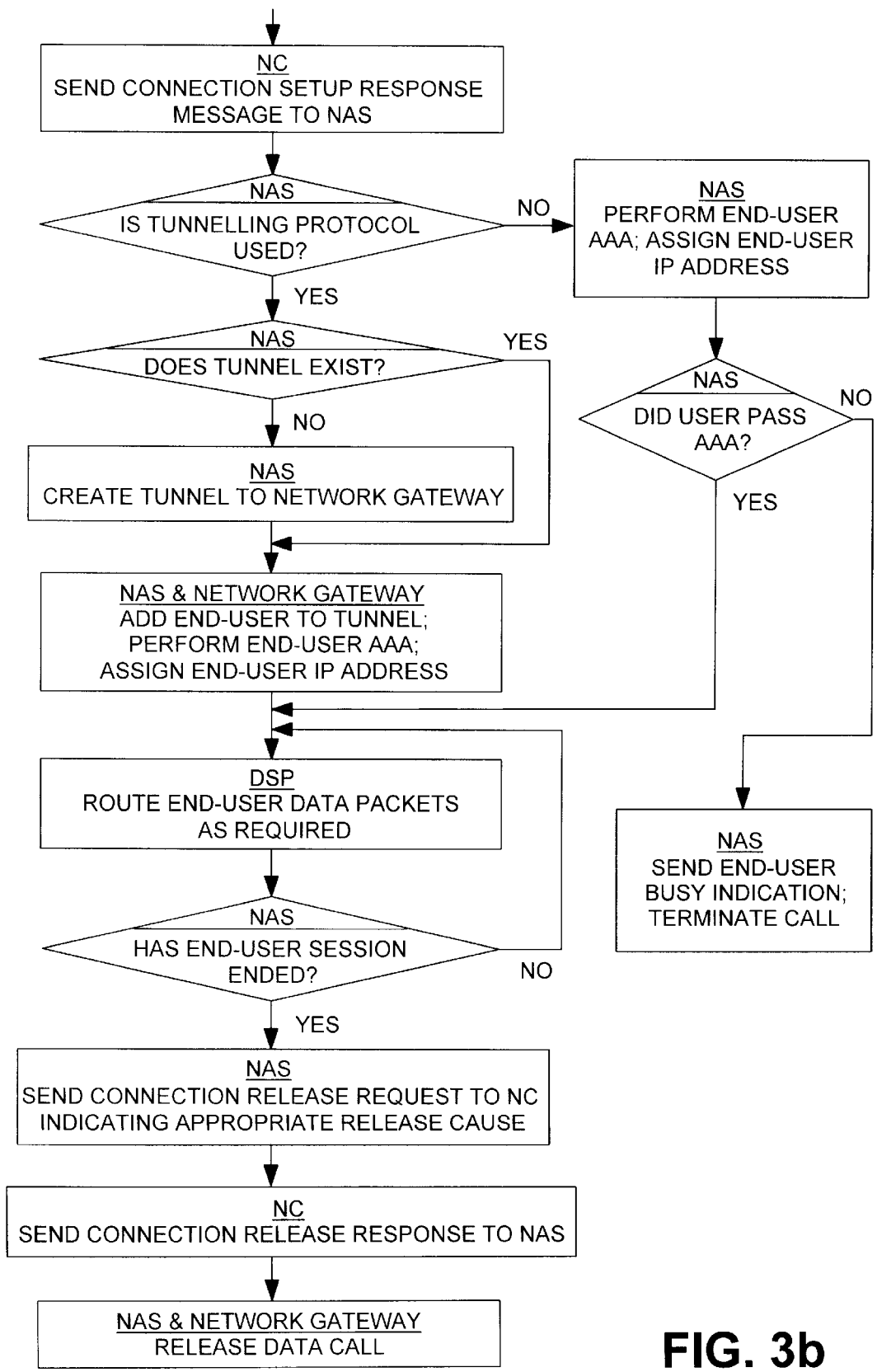

FIGS. 3a and 3b illustrate the operation of the DATS system described above with reference to FIG. 2. A call destined to a subscribed DSP is completed through the central office 3 to the NAS 5. Of necessity, such calls include signalling of the DSP directory number from the CO 10 to the NAS 5. Referring to FIG. 2, the call is originated by an end-user via a PC 1 outfitted with either an analog modem or an ISDN Basic Rate Interface (BRI) Terminal Adaptor (TA). The number dialed by the end-user 1 is sent via Dual Tone Multi-Frequency (DTMF) or pulse signalling to the CO 3, where the dialed number is recognized as a DATS-associated number and routed appropriately to a NAS 5 via a CO trunk 4, providing the dialed number and calling party number to the NAS 5 via signalling depending on the CO trunk 4 type.

The NAS 5 in turn sends a connection setup request to the NC 12 using a message-based signalling protocol understood by both the NAS 5 and the NC 12. This protocol may include information that authenticates the NAS to the NC, and the NC to the NAS (for example using NAS/NC identifiers and shared secrets, both of which may be encrypted). Provided in the connection setup request message is the dialed number, the calling party number, the call type (analog or ISDN data) a unique NAS identifier, and a unique call identifier. Other call resources such as requested bandwidth may also be included.

The NC 12 first checks the validity of the NAS identifier and the dialed number indicated in the connection setup request message. If the information is determined to be invalid, that is, if either the NAS identifier or the dialed number do not match the list of NAS identifiers and dialed numbers stored in the NC 12, the NC 12 replies to the NAS 5 with a connection setup response indicating a response code that the NAS 5 interprets as a refusal, which results in an error indication (i.e. fast busy tone or disconnect for an analog modem call, or appropriate ISDN signalling message for an ISDN data call) to the end user 1.

If the information received by the NC 12 in the connection setup request message is valid, the NC 12 checks the number of active call resource(s) currently logged against the dialed number (or dialed number group of which the dialed number is a member). A call resource may be a physical or logical entity required to complete a DATS call (for example, the number of logical ports, the bandwidth available for each call, the aggregate bandwidth for all calls to a DSP). If the number of active call resource(s) is equal to the call resource limit(s) stored against the dialed number or dialed number group, the NC 12 replies to the NAS 5 with a connection setup response indicating a response code that the NAS 5 interprets as a refusal, which results in an indication to the end user 1 that all circuits are busy. If the number of active calls is less than the call limit associated against the dialed number or dialed number group, the call processing proceeds.

If a tunnelling protocol is used by the NAS, the NC 12 then chooses a destination Network Gateway from a list of Network Gateways (associated against the dialed number or dialed number group) stored in the NC 12.

If the incoming call is a segment of a MLP bundle, then the appropriate Network Gateway is chosen to support MLP requirements. If the call is not associated with a MLP bundle, Network Gateway selection is based on the current number of active calls on each Network Gateway 9, and a Nework Gateway relative loading factor stored against each Network Gateway listed on the NC 12.

If a Network Gateway's administrative state (stored at the NC) has been set to "disabled", the NC does not consider the Network Gateway in the load balancing algorithm.

In order to prevent mesh tunnel connectivity between NASs 5 and Network Gateways 9 (resulting in excessive tunnel protocol overhead), the Network Gateway selection can also favour a Network Gateway 9 to which the NAS 5 in question already has a tunnel established. This tunnel favouring is also known as "Tunnel Affinity".

The NC 12 then responds with a connection request response with a response code that the NAS 5 interprets as authorization to complete the data call, and the NC active call counts against the dialed number (or dialed number group) and Network Gateway (if applicable) are incremented. Also included in the connection request is the Network Gateway identifier to which the call is to be routed, its data network address, and any additional service information the NAS 5 may need to complete the call. Once authorized to continue with the data call setup, the NAS 5 will begin to process the analog modem signal or ISDN data frames (depending on the call type), and will commence end-user authentication protocols.

If no tunnelling protocol is used by the NAS 5, the NAS 5 performs all AAA, and once the end-user 1 is authorized, the end-user 1 is assigned a network address (if required), after which end-user originated packets can be routed to the intended address, and end-user defined packets can be routed to the end-user 1.

If a tunnelling protocol is to be used, the NAS 5 sets up a tunnel (if one does not already exist), and AAA information is forwarded on to the DSP authentication device according to the tunnelling protocol methods.

If a network failure condition exists, such that the NAS 5 is unable to open a tunnel to the Network Gateway 9 indicated by the NC 12, the NAS 5 sends an indication to the NC 12 requesting a new Network Gateway allocation, which will result in a response from the NC 12 with a new Network Gateway 9, and the NC 12 marks the failed Network Gateway administrative status as "disabled", which will prevent further calls from being routed to the failed Network Gateway.

Once the end-user 1 is authorized, the end-user 1 is assigned a network address (if required), after which end-user originated packets can be routed to the intended address, and end-user defined packets can be routed to the end-user. Once the end-user 1 has been authenticated, the NAS 5 sends a connection confirmation indication, which includes information relating to the data call, such as initial send/receive data rate, Network Gateway identifier, and tunnel identifier (if required). If at any time end-user authorization fails, the end user 1 is disconnected according to the associated authorization protocol, and the NAS 5 sends a connection release indication to the NC 12 with the appropriate termination code and associated connection identifier, and the NC active call counts against the dialed number (or dialed number group) and Network Gateway (if applicable) are decremented.

Data call release occurs if the end-user 1 ends a session, if the DSP ends a session, or if the NC 12 forces a session to be released (as a result of a LEC personnel command to the NC via the NC Management Terminal). If the data call is to be released as a result of end-user 1 or DSP action, the NAS 5 sends the NC 12 a connection release indication with an appropriate and mutually understood cause code and connection identifier, to which the NC 12 responds with an acknowledgement message, and the NC active call counts against the dialed number (or dialed number group) and Network Gateway (if applicable) are decremented. If the data call is released as a result of an LEC personnel command to the NC 12, the NC 12 sends the NAS 5 a connection release indication with an appropriate and mutually understood cause code and connection identifier, to which the NAS 5 responds with an acknowledgement message, and the NC active call counts against the dialed number (or dialed number group) and Network Gateway (if applicable) are decremented. If, at any time, a network failure occurs such that multiple end-user sessions are lost and/or tunnel connectivity is lost, the NAS 5 will send multiple connection release indications with an appropriate and mutually understood cause code and connection identifier, to which the NAS 5 responds with corresponding acknowledgement messages, and the NC active call counts against the associated dialed number(s) (or dialed number group(s)) and Network Gateway(s) (if applicable) are decremented.

The NC Management Terminal 14 may be used to assign and enforce administrative states on individual DATS system elements, for example any NAS 5, Network Gateway 9 or any directory number or directory number group configuration stored on the NC 12. If the administrative state of a Network Gateway 9 is set to "disabled", the NC 12 will not route any subsequent calls to that Network Gateway 9, nor will the NC 12 consider that Network Gateway's current load in load balancing algorithms, while existing calls previously routed to that Network Gateway 9 will remain unaffected. If the administrative state of a directory number or a group of directory numbers is set to "disabled", the NC 12 will refused requests for connection to that directory number or any directory number in that group of directory numbers from any NAS 5, while existing calls to that directory number or any directory number in that group of directory numbers remain unaffected.

If the administrative state of a NAS 5 is set to "disabled", the NC 12 will refuse connection setup requests sent by that NAS 5 while existing calls previously routed through that NAS 5 will remain unaffected. In addition, when a NAS 5 is flagged as "disabled", the NC 12 may signal the flagged NAS 5 to busy out all PRI channels terminating on that NAS 5, so that the PSTN will not route calls on those PRI channels. If the NC Management Terminal 14 is used to re-enable the NAS 5, the NC 12 may signal the re-enabled NAS 5, causing the re-enabled NAS 5 to signal the PSTN that its PRI B-channels are now available for use so that the PSTN will resume routing calls on those PRI channels.

If at any time a NAS-generated connection setup request is associated with a NAS 5, dialed number, dialed number group, or Network Gateway that has been marked at the NC 12 as being administratively disabled, the NC 12 replies to the NAS 5 with a connection setup response indicating a response code that the NAS 5 interprets as a refusal, which results in an error indication (i.e. fast busy tone or disconnect) to the end user 1.

At regular intervals, the NC 12 may send a status indication to one or more NAS 5, to which the NAS 5 responds with a status confirm message (using the aforementioned signalling protocol). The status confirm message will include a list of all currently active calls, with their identifiers. The NC 12 uses this information to determine if the information stored in the NC 12 is accurate. If the information is not accurate (i.e. some unexpected new calls may be present or some expected calls may be absent), the NC 12 updates its information, and may send another status indication to the NAS 5 requesting more detailed information.

All connection setup requests, connection setup responses, connection release requests, connection release acknowledgements, status indications, status confirmations, many error conditions and statistics are logged or counted for post analysis purposes. In addition, all current (active) call information is stored at the NC 12 for real-time querying and troubleshooting.

The basic data call control and monitoring features described herein, and variations of the same, may well be enhanced. For example, such enhancements include time-of-day dependent DSP service quotas, application to newer access technologies such as ADSL, implementation of redundant NCs, distributing multiple NCs to increase scaleability, supporting mechanised DSP management interfaces for real-time querying of DATS-related statistics by DSP personnel, and incorporation of other signalling protocols such as common channel signalling system number 7 (CCS7) and IN interworking.

While FIG. 2 shows only one instance of each of the subscriber PC 1, the subscriber loop 2, the CO 3, the CO trunk 4, NAS 5, the NAS data network interface 6, the DSP data network interface 8, the network gateway 9 and the DSP server 11, it is to be understood that in most applications, there will be a plurality of each of these network components. The embodiment of the invention described above enables a common network controller 12 to manage plural NASs 5 shared by plural DSPs 11 using plural network gateways 9 to realize economies of scale.

Various modifications and changes could be made to the invention without departing from the spirit and scope thereof. It should therefore be understood that the claims are not to be considered as being limited to the precise embodiments set forth above, in the absence of specific limitations directed to each embodiment.

We claim:

1. A data access transport system comprising a plurality of network access servers and a network controller connected to the network access servers;

each network access server being operable:
to send a connection setup request to the network controller on receipt of a data call before answering the data call, the connection setup request specifying a data service provider to which a connection is requested; and
to receive a connection setup response from the network controller, the connection setup response indicating whether the requested connection is to be completed;
to respond to a connection setup response indicating that the connection is to be completed by answering the data call and initiating a connection to the specified data service provider; and
to respond to a connection setup response indicating that the connection is not to be completed by initiating a busy indication; and the network controller being operable:
to receive a connection setup request from any of the network access servers;
to determine whether a quantity of network resources currently used by the data service provider specified in the connection setup request is less than an service quota assigned to the data service provider; and
to send a connection setup response to the network access server which sent the connection setup request, the connection setup response indicating that the requested connection is to be completed when the quantity of network resources currently used by the data service provider is less than the assigned service quota and the connection setup response indicating the requested connection is not to be completed when the quantity of network resources currently used by the data service provider is not less than the assigned service quota.

2. A system as defined in claim 1, wherein each network access server is operable:
to detect termination of data calls; and
to send a connection release request to the network controller upon detection of termination of a data call.

3. A network controller for use in a data access transport system comprising a plurality of network access servers connected to the network controller, the network controller comprising:
means for receiving a connection setup request from any of the network access servers;
means for determining whether a quantity of network resources currently used by the data service provider specified in the connection setup request is less than an service quota assigned to the data service provider; and
means for sending a connection setup response to the network access server which sent the connection setup request, the connection setup response indicating that the requested connection is to be completed when the quantity of network resources currently used by the data service provider is less than the assigned service quota and the connection setup response indicating the requested connection is not to be completed when the quantity of network resources currently used by the data service provider is not less than the assigned service quota.

4. A network controller as defined in claim 3, further comprising:
means for maintaining a count of active calls to each data service provider served by the data access transport system;
means for maintaining a count of active calls served by each network gateway served by the data access transport system; and
means for selecting a network gateway for completing a connection to a data service provider based on the counts of active calls served by each network gateway connected to the data service provider;
the means for sending a connection setup response being responsive to the means for selecting a network gateway to send a connection setup response specifying the selected network gateway.

5. A network controller as defined in claim 4, further comprising means for maintaining a record of tunnels currently connected between network access servers and network gateways, the means for selecting a network gateway being operable to select a network gateway based on the counts of active calls served by each network gateway and the record of tunnels currently connected between network access servers and network gateways.

6. A network controller as defined in claim 4, further comprising means for recognizing call setup requests corresponding to segments of a MLP call, the means for selecting a network gateway for completing a connection to a data service provider being responsive to the means for recognizing call setup requests corresponding to segments of a MLP call to select the same network gateway for all segments of a MLP call.

7. A network controller as defined in claim 3, further comprising means for recognizing call setup requests corresponding to data calls requiring 56 kbps service, the means for sending a connection setup response being responsive to the means for recognizing call setup requests corresponding to data calls requiring 56 kbps service to send a connection setup response indicating that 56 kbps service is required.

8. A network controller as defined in claim 3, further comprising:
means for deriving operational data from at least one of connection setup requests, connection setup responses, connection release requests, connection release acknowledgements and error conditions detected by the network controller; and
means for recording at least some of the derived operational data.

9. A network controller as defined in claim 4, further comprising means for flagging network gateways as disabled, the means for selecting a network gateway responding to the means for flagging network gateways as disabled by not selecting any network gateway currently flagged as disabled.

10. A network controller as defined in claim 9, wherein the means for flagging network gateways as disabled is responsive to receipt of a message from a network access server indicating a failure to open a connection to a particular network gateway to flag that particular network gateway as disabled.

11. A network controller as defined in claim 10, wherein the means for selecting a network gateway is responsive to receipt of the message indicating a failure to open a connection to a particular network gateway to select another network gateway for connection of the call.

12. A network controller as defined in claim 3, further comprising means for flagging groups of directory numbers as disabled, each directory number group comprising at least one directory number, the means for sending a connection setup response being responsive to the means for flagging directory number groups as disabled to send connection setup responses indicating that connections are not to be completed in response to connection setup requests specifying directory numbers in directory number groups which are flagged as disabled.

13. A network controller as defined in claim 3, further comprising means for flagging network access servers as disabled, the means for sending a connection setup response being responsive to the means for flagging network access servers as disabled to send connection setup responses indicating that connections are not to be completed in response to connection setup requests sent by network access servers which are flagged as disabled.

14. A network access server for use in a data access transport system comprising a network controller connected to the network access server, comprising:
means for sending a connection setup request to the network controller on receipt of a data call before answering the data call, the connection setup request specifying a data service provider to which a connection is requested;
means for receiving a connection setup response from the network controller, the connection setup response indicating whether the requested connection is to be completed;
means for answering the data call and initiating a connection to the specified data service provider in response to a connection setup response indicating that the connection is to be completed; and
means for initiating a busy indication in response to a connection setup response indicating that the connection is not to be completed.

15. A network access server as defined in claim 14, further comprising:
means for detecting termination of data calls; and
means for sending a connection release request to the network controller upon detection of termination of a data call.

16. A network access server as defined in claim 14, wherein the means for initiating a connection to the specified data service provider initiates a connection via a network gateway specified in the connection setup response.

17. A network access server as defined in claim 14, further comprising means for sending a message the network controller upon failure to complete a connection to a particular network gateway, the message specifying the particular network gateway.

18. A network access server as defined in claim 14, further comprising means responsive to a signal indicating that the network access server is disabled to send a signal to an access network indicating that access channels of the network access server are unavailable for use.

19. A network access server as defined in claim 18, further comprising means responsive to a signal indicating that the network access server is re-enabled to send a signal to an access network indicating that access channels of the network access server are available for use.

20. A method for operating a data access transport system comprising a plurality of network access servers and a network controller connected to the network access servers, the method comprising:
sending a connection setup request from a network access server to the network controller on receipt of a data call before answering the data call, the connection setup request specifying a data service provider to which a connection is requested;
determining at the network controller whether a quantity of network resources currently used by the data service provider specified in the connection setup request is less than a service quota assigned to the data service provider;
sending a connection setup response from the network controller to the network access server which sent the connection setup request, the connection setup response indicating that the requested connection is to be completed when the quantity of network resources currently used by the data service provider is less than the assigned service quota and the connection setup response indicating the requested connection is not to be completed when the quantity of network resources currently used by the data service provider is not less than the assigned service quota;
responding at the network access server to a connection setup response indicating that the connection is to be completed by answering the data call and initiating a connection to the specified data service provider; and
responding at the network access server to a connection setup response indicating that the connection is not to be completed by initiating a busy indication.

21. A method as defined in claim 20, further comprising:
detecting termination of a data call at a network access server; and sending a connection release request to the network controller upon detection of the termination.

22. A method for operating a network controller for use in a data access transport system comprising a plurality of network access servers connected to the network controller, the method comprising:

receiving a connection setup request from any of the network access servers;

determining whether a quantity of network resources currently used by the data service provider specified in the connection setup request is less than a service quota assigned to the data service provider; and sending a connection setup response to the network access server which sent the connection setup request, the connection setup response indicating that the requested connection is to be completed when the quantity of network resources currently used by the data service provider is less than the assigned service quota and the connection setup response indicating the requested connection is not to be completed when the quantity of network resources currently used by the data service provider is not less than the assigned service quota.

23. A method as defined in claim 22, further comprising:

maintaining a count of active calls to each data service provider served by the data access transport system;

maintaining a count of active calls served by each network gateway served by the data access transport system; and selecting a network gateway for completing a connection to a data service provider based on the counts of active calls served by each network gateway connected to the data service provider;

the step of sending a connection setup response comprising sending a connection setup response specifying the selected network gateway.

24. A method as defined in claim 23, further comprising maintaining a record of tunnels currently connected between network access servers and network gateways, the step of selecting a network comprising selecting a network gateway based on the counts of active calls served by each network gateway and the record of tunnels currently connected between network access servers and network gateways.

25. A method as defined in claim 23, further comprising recognizing call setup requests corresponding to segments of a MLP call, the step of selecting a network gateway for completing a connection to a data service provider comprising selecting the same network gateway for all segments of a MLP call.

26. A method as defined in claim 22, further comprising recognizing call setup requests corresponding to data calls requiring 56 kbps service, the step of sending a connection setup response comprising sending a connection setup response indicating that 56 kbps service is required.

27. A method as defined in claim 22, further comprising:

deriving operational data from at least one of connection setup requests, connection setup responses, connection release requests, connection release acknowledgements and error conditions detected by the network controller; and recording at least some of the derived operational data.

28. A method as defined in claim 22, further comprising flagging network gateways as disabled, the step of selecting a network gateway comprising not selecting any network gateway currently flagged as disabled.

29. A method as defined in claim 22, further comprising flagging directory number groups as disabled, each directory number group comprising at least one directory number, the step of sending a connection setup response comprising sending a connection setup response indicating that a connection is not to be completed for any connection setup request specifying a directory number in a directory number group which is flagged as disabled.

30. A method as defined in claim 22, further comprising flagging network access servers as disabled, the step of sending a connection setup response comprising indicating that connections are not to be completed in response to connection setup requests sent by network access servers which are flagged as disabled.

31. A method for operating a network access server in a data access transport system comprising a network controller connected to the network access server, comprising:

sending a connection setup request to the network controller on receipt of a data call before answering the data call, the connection setup request specifying a data service provider to which a connection is requested;

receiving a connection setup response from the network controller, the connection setup response indicating whether the requested connection is to be completed;

answering the data call and initiating a connection to the specified data service provider in response to a connection setup response indicating that the connection is to be completed; and initiating a busy indication in response to a connection setup response indicating that the connection is not to be completed.

32. A method as defined in claim 31, further comprising:

detecting termination of data calls; and sending a connection release request to the network controller upon detection of termination of a data call.

33. A method as defined in claim 31, wherein the step of initiating a connection to the specified data service provider comprises initiating a connection via a network gateway specified in the connection setup response.

* * * * *